May 14, 1940. R. C. INGERSOLL 2,200,335
BACON FRYER
Filed May 2, 1938
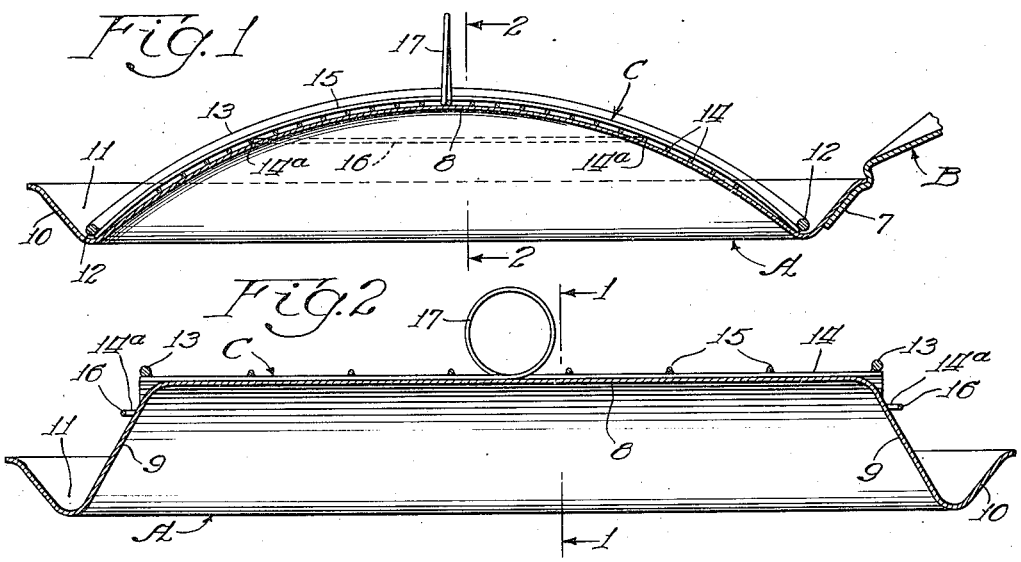
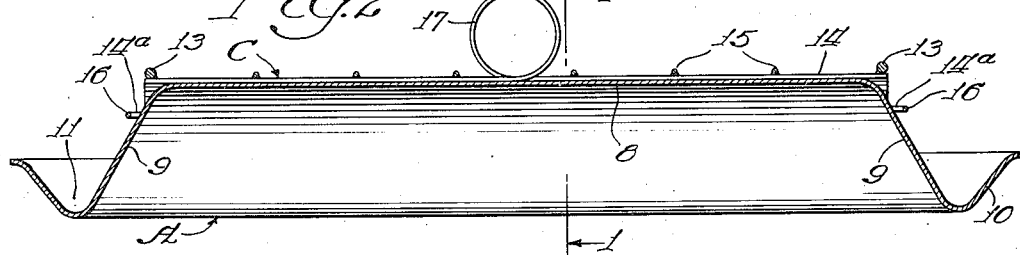
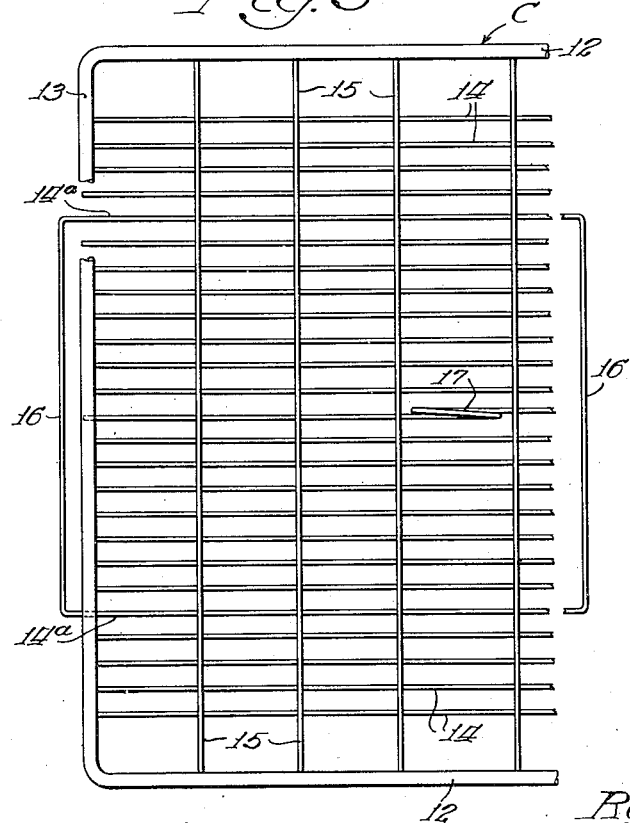
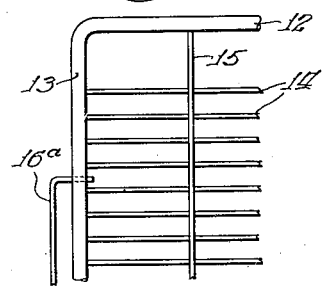
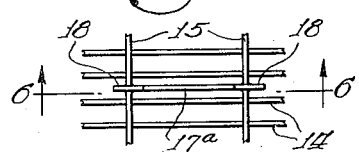
Inventor:
Roy C. Ingersoll
By: Edward C. Fitzhaugh
Atty.

Patented May 14, 1940

2,200,335

UNITED STATES PATENT OFFICE 2,200,335

BACON FRYER

Roy C. Ingersoll, Winnetka, Ill., assignor to Borg-Warner Corporation, Chicago, Ill., a corporation of Illinois Application May 2, 1938, Serial No. 205,447

9 Claims. (Cl. 53—5)

This invention relates to bacon fryers, and has as its object to provide an improved utensil for frying bacon in such a manner as to prevent its curling and to secure a uniform frying of the entire surface of a strip of bacon.

The utensil contemplated by the present invention, comprises, in general, a heat transfer member providing an arched frying surface having shouldered end regions, and a grid, arched to conform substantially to said surface, for the purpose of holding down the strips of bacon in contact with said surface, said grid having end yoke members adapted to overhang said shouldered regions of the heat transfer member so as to position the grid with respect to the heat transfer member. Accordingly, the invention has as one of its objects to provide a bacon frying utensil of the type mentioned, wherein there is embodied means, of simple, durable and inexpensive construction, for positioning the hold-down grid with respect to the frying surface.

Another object of the invention is to provide a frying utensil of the type specified, in which the grid is provided with means whereby it may be lifted by a tool such as for example a kitchen fork, and whereby it may be manipulated with ease.

Other objects, the advantages and uses of the invention will become apparent after reading the following specification and claims, and after consideration of the drawing forming a part of the specification, wherein:

Fig. 1 is a transverse sectional view through a utensil embodying the invention.

Fig. 2 is a longitudinal sectional view of the same taken as indicated by the line 2—2 of Fig. 1.

Fig. 3 is a plan view of the grid.

Fig. 4 is a plan view of one corner of a modified form of the grid.

Fig. 5 is a plan view of the central region of another modification of the grid; and Fig. 6 is a sectional view taken on the line 6—6 of Fig. 5.

The bacon fryer shown in the drawing for the purpose of illustrating one form in which the invention may be embodied, may include a pan member, indicated generally by the reference character A, a handle B secured at 7 to the rim of the pan member A, and a hold-down grid, indicated generally at C, conforming to the frying surface formed by the cylindrically arched central portion 8 of the pan A.

The pan A is rectangular in shape, the handle B being attached at the center of one side, and the frying portion 8 being arched from side to side of the pan. The lower extremities of the arch together with the lower extremities of shouldered regions 9 form the bottom of the pan. The shouldered regions 9 form the ends of the arched portion 8. Beyond these lower regions, the pan is provided with an upwardly inclined annular flange 10 which forms, together with the lower regions of the arched portion 8 and shouldered regions 9, a trough 11 extending entirely around the arched portion 8. The trough 11 serves the purpose of collecting the grease that is fried from the bacon.

The grid C comprises a frame having straight side bars 12 and end portions 13, arched to conform to the curvature of the frying portion 8 of the pan. Traversing the space within the frame is a grating portion comprising longitudinal bars 14 and transverse arched bars 15. The frame is formed of relatively heavy wire, and the grating portion is formed of relatively light wire. The bars of the grating may be secured to each other and to the frame by dipping the entire assembly in solder or by any other suitable method.

Two of the longitudinal grating bars, designated herein as 14A, are extended beyond the end portions 13 of the frame and joined together by a straight transverse bar 16, arranged in chordal relation to the arched end portions 13 of the frame, so as to form yokes which are adapted to overhang the shouldered end portions 9 of the frying portion 8, whereby to position the grid with respect to the frying portion. This is a distinct advantage in view of the fact that the grid must be handled while hot, and in order to do so, it is provided with a centrally located loop or handle member 17, adapted to receive a tine of a fork or other kitchen implement. The shouldered end portions 9 of the frying portion 8, being inclined outwardly and downwardly, are adapted to coact with the yoke members 16 to facilitate the positioning of the grid on the frying portion. Should the grid be off-center with relation to the frying portion, the engagement of one of the yokes 16 against a shouldered portion 9, will, under the weight of the grid, cause the latter to shift longitudinally as it settles into position.

In the operation of the utensil, the strips of bacon are laid transversely across the frying surface 8, their ends curving downwardly. They will be held in contact with the frying surface by the grid C so as to be prevented from curling and so as to be uniformly subjected to the heat of the frying surface over their entire area. The grease that is fried out of them will run down the inclined sides of the arched portion 8 and collect in the trough 11.

The loop or handle portion 17 is preferably circular as shown in the preferred form of the invention, so that when hanging from a tine of a fork, the loop will adjust itself under the weight of the grid until the tine is tendered at the top of the loop. As a result, the grid will hang in a horizontal position, instead of tilting toward one end or the other. This likewise is of importance in connection with replacing the grid on the frying surface.

In the modification shown in Fig. 4, the yoke members 16A are formed as separate yokes of wire, and are attached to the end portions 13 of the frame as shown.

In the modification shown in Figs. 5 and 6, the handle member 17A is in the form of a straight yoke, separately formed, and having end portions 18 soldered or otherwise suitably secured to the two central arched cross bars 15.

I claim:

1. In a bacon fryer, means forming an arched heat transfer surface having shouldered end regions, and a grid, arched to conform substantially to said surface, said grid including transverse end members arranged in chordal relation to its main body, said end members adapted to overhang said shouldered regions whereby to position said grid with respect to said surface.

2. In a bacon fryer, means forming an arched heat transfer surface having shouldered end regions, and a grid arched to conform substantially to said surface, said grid having a frame the end portions of which are correspondingly arched, and yoke members bridging said arched end portions in chordal relation thereto and adapted to overhang said shouldered regions whereby to position said grid with respect to said surface.

3. In a bacon fryer, means forming an arched heat transfer surface having shouldered end regions, and a grid arched to conform substantially to said surface, said grid having a frame the end portions of which are correspondingly arched, and yoke members bridging said arched end portions and adapted to overhang said shouldered regions whereby to position said grid with respect to said surface.

4. In a bacon fryer, a frying pan including an arched frying portion having shouldered end regions and a trough portion surrounding said frying portion, for collecting grease, and a grid, arched to conform to said frying portion, said grid having a frame the ends of which are correspondingly arched, and having yoke members bridging said arched ends and adapted to overhang said shouldered regions to position said grid with respect to said frying portions.

5. In a bacon fryer, means forming an arched heat transfer surface having shouldered end regions, and a grid including a frame of heavy wire the ends of which are arched to conform substantially to the curvature of said frying portion, and a grating portion of finer wire traversing the area within said frame and conforming substantially to said frying portion, and yoke members bridging said arched end portions and adapted to overhang said shouldered regions whereby to position said grid with respect to said surface.

6. In a bacon fryer, means forming an arched heat transfer surface having shouldered end regions, and a grid the ends of which are arched to conform substantially to the curvature of said frying portion, and yoke members bridging said arched end portions and adapted to overhang said shouldered regions whereby to position said grid with respect to said surface, said yoke members comprising substantially straight bars extending between points intermediate the upper and lower extremities of said end portions of the grid.

7. In a bacon fryer, means forming an arched heat transfer surface having shouldered end regions, and a grid arched to conform substantially to said surface, said grid including means adapted to embrace said shouldered end regions whereby to position said grid with respect to said frying portion.

8. In a bacon fryer, means forming an arched heat transfer surface having shouldered end regions, and a grid including a frame the ends of which are arched to conform substantially to the curvature of said frying portion, and a grating portion including longitudinal bars extending between and secured to said end portions, transverse bars arched to conform substantially to the surface of said frying portion, and yoke members bridging said arched ends and adapted to overhang said shouldered regions to position said grid with respect to said frying portion, said yoke members being formed as continuations of two of said longitudinal bars.

9. In a bacon fryer, means forming an arched heat transfer surface having shouldered end regions, and a grid arched to conform substantially to said surface, said grid having a frame the end portions of which are correspondingly arched, and yoke members bridging said arched end portions and adapted to overhang said shouldered regions whereby to position said grid with respect to said surface, said yoke members being formed of lengths of wire attached to said end portions of the frame.

ROY C. INGERSOLL.